United States Patent
Lozano et al.

(10) Patent No.: US 8,406,225 B2
(45) Date of Patent: Mar. 26, 2013

(54) NETWORK CONFIGURATION AND ROUTING

(75) Inventors: Elena Lozano, Plano, TX (US); Edmund W. Peaslee, III, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1546 days.

(21) Appl. No.: 11/765,112

(22) Filed: Jun. 19, 2007

(65) Prior Publication Data
US 2008/0317237 A1 Dec. 25, 2008

(51) Int. Cl.
*H04L 12/66* (2006.01)
(52) U.S. Cl. ... 370/353; 370/386; 370/401; 379/221.02; 709/221
(58) Field of Classification Search ..................... None
See application file for complete search history.

(56) References Cited

U.S. PATENT DOCUMENTS

| | | | | |
|---|---|---|---|---|
| 5,703,938 | A * | 12/1997 | Lucas et al. | 379/112.05 |
| 7,145,898 | B1 * | 12/2006 | Elliott | 370/352 |
| 7,466,710 | B1 * | 12/2008 | Clemm et al. | 370/401 |
| 7,660,402 | B1 * | 2/2010 | Dwekat et al. | 379/114.08 |
| 7,738,647 | B2 * | 6/2010 | Davis et al. | 379/220.01 |
| 2001/0028706 | A1 * | 10/2001 | Nolting | 379/134 |
| 2003/0118169 | A1 * | 6/2003 | Savoor et al. | 379/219 |
| 2005/0031114 | A1 * | 2/2005 | Boeckman et al. | 379/220.01 |
| 2005/0088974 | A1 * | 4/2005 | Savoor et al. | 370/235 |
| 2006/0209691 | A1 * | 9/2006 | Boggs | 370/230 |
| 2008/0002576 | A1 * | 1/2008 | Bugenhagen et al. | 370/229 |

* cited by examiner

*Primary Examiner* — Donald Mills

(57) ABSTRACT

A system may install a trunk between a first switch and an end office, where the trunk is a trunk home for the end office. The system may further identify Numeric Numbering exchanges (NXXs) that home to the end office. Traffic for at least one of the identified NXXs is routed to the end office through a second switch that is different than the first switch. The system also causes traffic for the identified NXXs to be routed to the first switch.

24 Claims, 22 Drawing Sheets

| NPA 610 | NXX 620 | DESTINATION ID 630 |
|---|---|---|
| 111 | 372 | SW 150-A ID |
| 111 | 412 | SW 150-A ID |
| 111 | 518 | SW 150-A ID |
| ... | ... | ... |
| 999 | 424 | TANDEM 222 ID |

File Edit Tools Window Help

TRUNK INSTALLATION REPORT

SWITCH NAME: SWITCH 145
(1) NPA: 111  NXXS: 518, 828
PREVIOUS ROUTING                          NEW ROUTING
SW 150-A → TN 160A                            TKHOME-SW 150-A

(2) NPA: 111  NXXS: 372, 444, 819, 820
PREVIOUS ROUTING                          NEW ROUTING
SW 150-B → TN 160B                            TKHOME-SW 150-A

(3) NPA: 111  NXXS: 154, 222, 234
PREVIOUS ROUTING
SW 150-B → TN 160C                            TKHOME-SW 150-A

SWITCH NAME: SW 150-A
(1) NPA: 111  NXXS: 154, 222, 234, 372, 444, 518, 819, 820, 828
PREVIOUS ROUTING                          NEW ROUTING
TN 160-A                                      DEOT
WATS                                          TN 160-A
                                              WATS

SWITCH NAME: SWITCH N

RUN AUDIT — 1040
BACK — 1030

1000
1010
1020

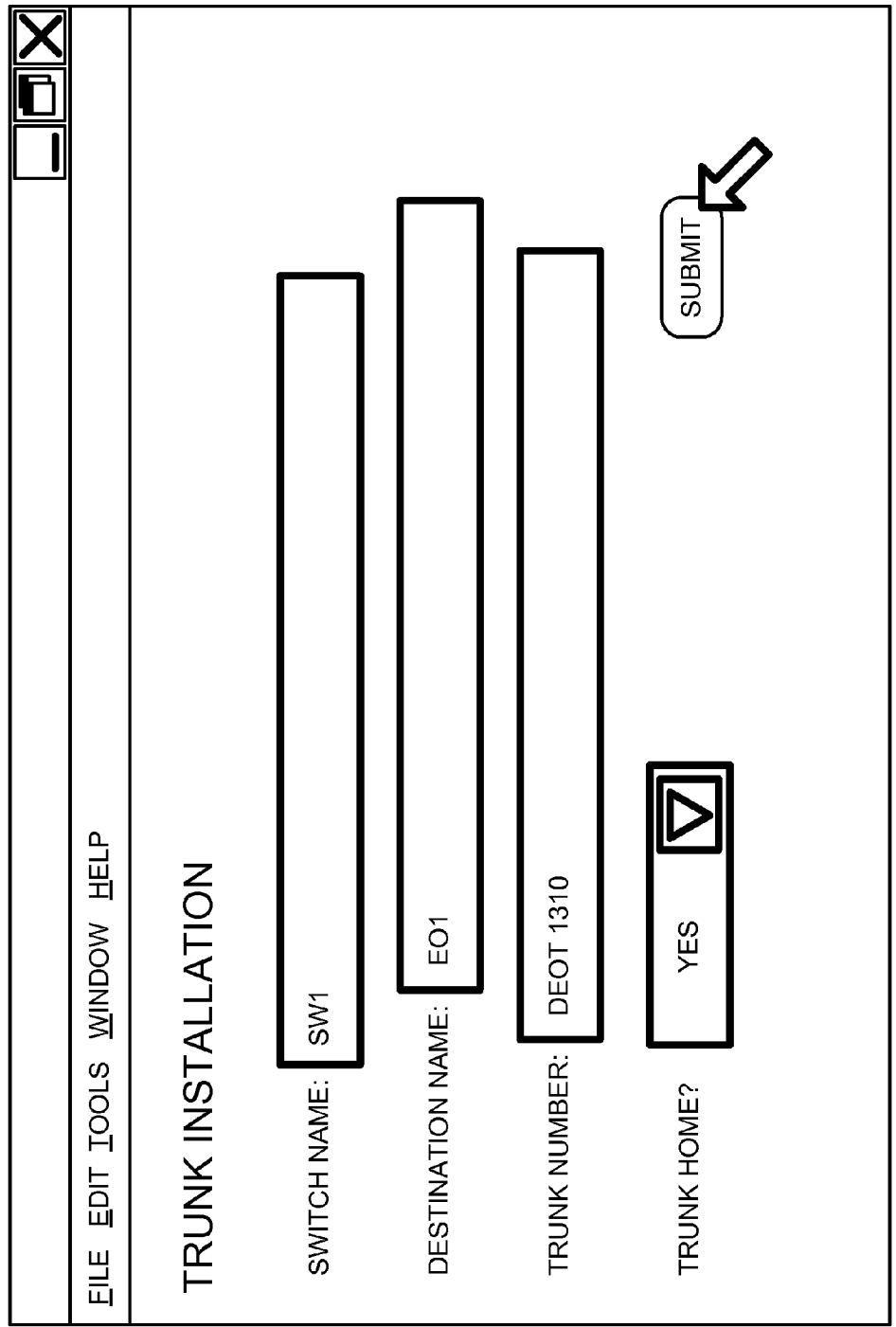

NETWORK CONFIGURATION AND ROUTING

BACKGROUND INFORMATION

Routing long distance telephone calls from a calling party to a called party may involve routing the telephone call from a first end office, associated with the calling party, through a long distance network to a second end office, associated with the called party. A number of network devices may be involved in this routing process. The changes incurred by the long distance service provider may be based on which network devices are involved in the routing process.

BRIEF DESCRIPTION OF THE DRAWINGS

FIG. 6 is an exemplary diagram of a portion of a computer-readable medium that may be associated with the long distance switch of FIG. 1;

FIGS. 9-11 are exemplary graphical user interfaces that may be provided to a user of the user device of FIG. 1 according to an exemplary embodiment;

FIGS. 13A-13H illustrate an example of the processing described above with respect to FIGS. 8 and 12.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
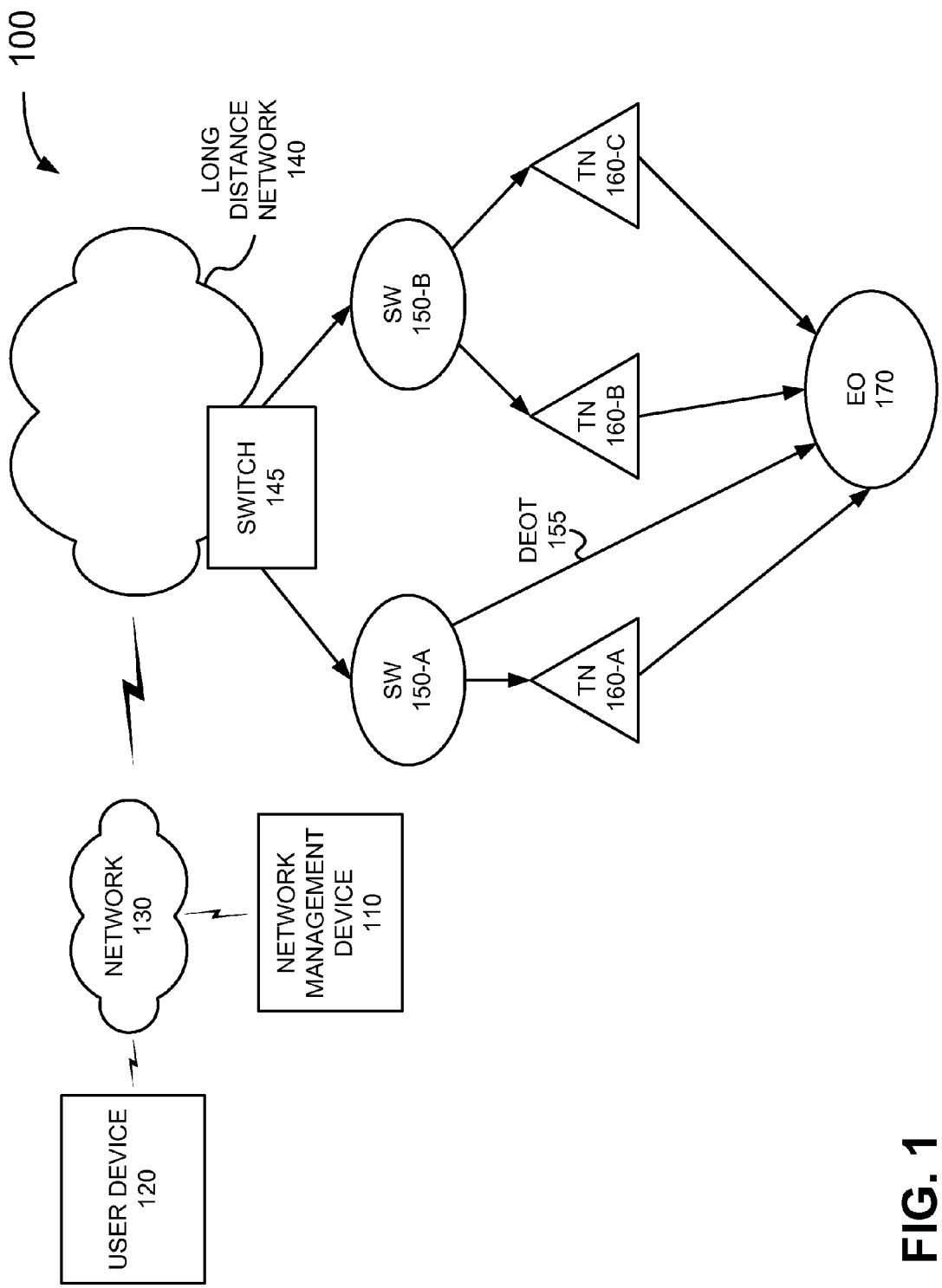
FIG. 1 is an exemplary network in which systems and methods, consistent with exemplary embodiments, may be implemented.

FIG. 1 is an exemplary network 100 in which systems and methods, consistent with exemplary embodiments, may be implemented. As illustrated, network 100 may include a network management device 110, a user device 120, a network 130, a long distance network 140, a long distance switch 145, a group of switches 150-A and 150-B (referred to collectively as "switches 150"), a group of tandem switches (TN) 160-A to 160-C (referred to collectively as "tandem switches 160"), and an end office (EO) 170. The number of network management devices, user devices, networks, long distance networks, long distance switches, switches, tandem switches, and end offices illustrated in FIG. 1 is provided for simplicity. In practice, there may be more or fewer network management devices, user devices, networks, long distance networks, long distance switches, switches, tandem switches, and end offices.

Network management device 110 may include a server entity. An entity may be defined as a device, such as a computer, a laptop, a personal digital assistant (PDA), or another type of computation or communication device, a thread or process running on one of these devices, and/or an object executable by one of these devices. In one embodiment, network management device 110 may allow users of user device 120 to configure network devices for routing traffic and to facilitate troubleshooting network problems.

User device 120 may include a client entity. As indicated above, an entity may be defined as a device, such as a computer, a laptop, a PDA, or another type of computation or communication device, a thread or process running on one of these devices, and/or an object executable by one of these devices. In one embodiment, user device 120 may allow a user to interact with network management device 110 for configuring network devices to route traffic and to facilitate troubleshooting network problems.

Network 130 may include one or more networks of any type, including a Public Land Mobile Network (PLMN), a Public Switched Telephone Network (PSTN), a local area network (LAN), a metropolitan area network (MAN), a wide area network (WAN), a private network, the Internet, an intranet, and/or another type of network. Network management device 110 and user device 120 may connect to network 130 via wired and/or wireless connections.

Long distance network 140 may include one or more networks that provide long distance telephone service. Long distance network 140 may include a group of long distance switches, such as long distance switch 145, that routes traffic for long distance network 140. Long distance switch 145 may include one or more switches that receive traffic and route the traffic towards the appropriate destination based, for example, on information associated with the received traffic, such as header information. In one implementation, long distance switch 145 may route traffic based on, for example, information identifying a Numeric Numbering eXchange (NXX) with which the traffic is associated. The NXX may be defined as exchange information that identifies the end office home to the subscriber to which the traffic is destined.

Switches 150 may include class 3 switches. Switches 150 may receive traffic from long distance network 140 and may route traffic toward the appropriate end office. Switches 150 may also receive traffic and may route the traffic toward long distance network 140. In one implementation, one or more of switches 150 may be associated with a trunk that connects switches 150 directly with an end office. For example, as illustrated in FIG. 1, switch 150-A may be associated with a direct end office termination (DEOT) trunk 155 that connects switch 150-A to end office 170. DEOT trunk 155 may include one or more lines or links that allow for traffic to be transferred directly from switch 150-A to end office 170. DEOT trunk 155 may allow for traffic to be routed to end office 170 more cheaply than routing the traffic through a tandem switch.

Tandem switches 160 may include class 3 or 4 switches that switch calls between end offices. As illustrated in FIG. 1, tandem switch 160-A may connect switch 150-A to end office 170. Tandem switch 160-A may connect to switch 150-A and end office 170 via trunks. Tandem switch 160-B may connect switch 150-B to end office 170. Tandem switch 160-B may connect to switch 150-B and end office 170 via trunks. Tandem switch 160-C may also connect switch 150-B to end office 170. Tandem switch 160-C may connect to switch 150-B and end office 170 via trunks. Each tandem switch 160-A to 160-C may home a different group of NXXs to end office 170. For example, tandem switch 160-A may home a first group of NXXs to end office 170, tandem switch 160-B may home a second group of NXXs to end office 170, and tandem switch 160-C may home a third group of NXXs to end office 170.

End office 170, also known as a central office, may include a switch to which subscriber trunks and/or loops may be terminated. End office 170 may be the home for a group of NXXs.

It will be appreciated that in some embodiments, a component in FIG. 1 may perform some or all of the functions described as being performed by another component in FIG. 1.

Figure 2:
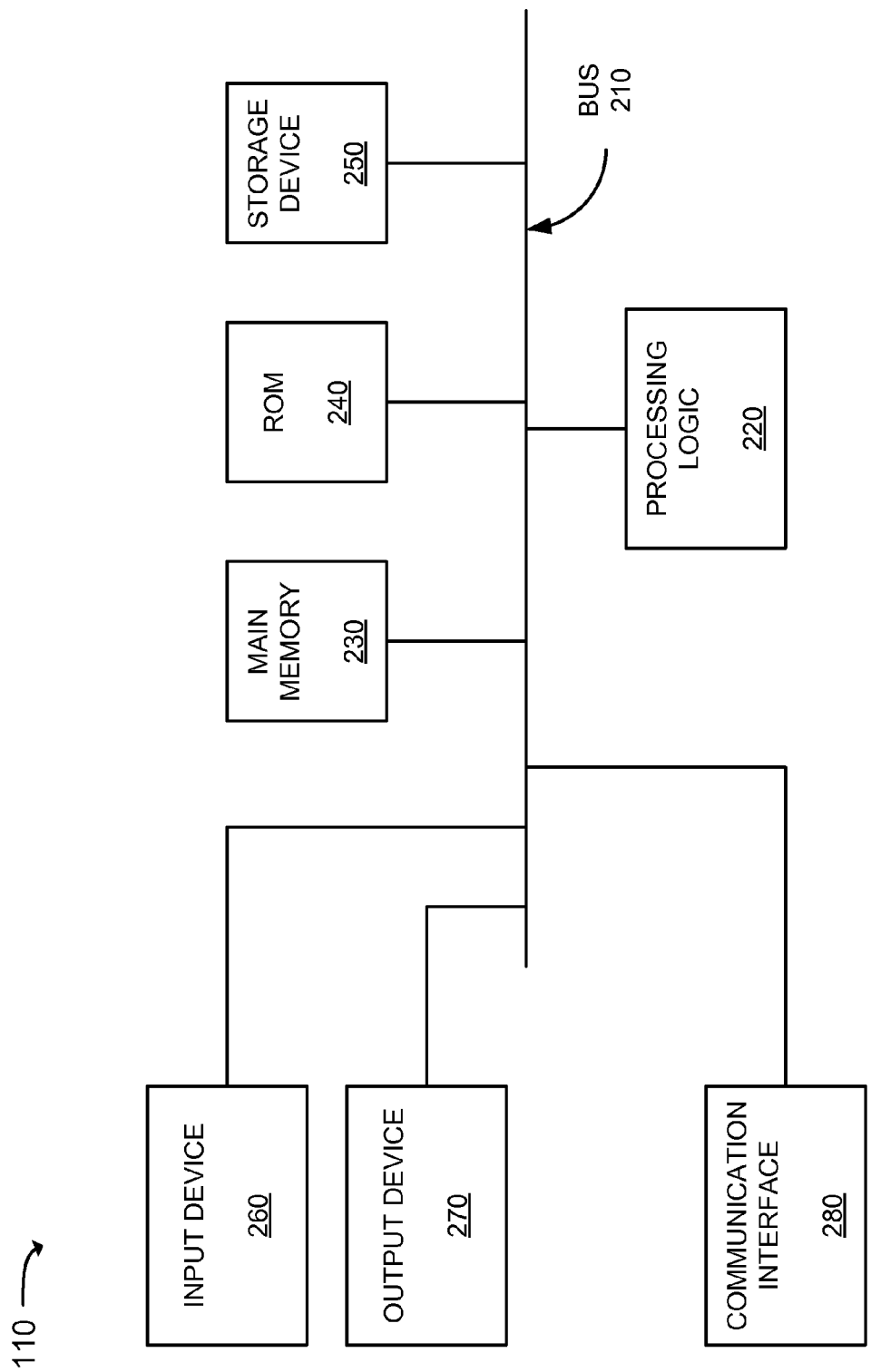
FIG. 2 is an exemplary block diagram of a network management device of FIG. 1 according to an exemplary embodiment.

FIG. 2 is an exemplary block diagram of network management device 110 according to an exemplary embodiment. User device 120 may be similarly configured. As illustrated, network management device 110 may include a bus 210, processing logic 220, a main memory 230, a read only memory (ROM) 240, a storage device 250, an input device 260, an output device 270, and a communication interface 280.

Bus 210 may include a path that permits communication among the elements of network management device 110. Processing logic 220 may include a processor, a microprocessor, or other types of processing logic, such as an application specific integrated circuit (ASIC), a field programmable gate array (FPGA), etc., that may interpret and execute instructions. Main memory 230 may include a random access memory (RAM) or another type of dynamic storage device that may store information and instructions for execution by processing logic 220. ROM 240 may include a ROM device or another type of static storage device that may store static information and instructions for use by processing logic 220. Storage device 250 may include a magnetic and/or optical recording medium and its corresponding drive.

Input device 260 may include a mechanism that permits an operator to input information to network management device 110, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables network management device 110 to communicate with other devices and/or systems, such as user device 120.

As will be described in detail below, network management device 110 may perform certain operations. Network management device 110 may perform these and other operations in response to processing logic 220 executing software instructions contained in a computer-readable medium, such as main memory 230. A computer-readable medium may be defined as a physical or logical memory device and/or carrier wave.

The software instructions may be read into main memory 230 from another computer-readable medium, such as storage device 250, or from another device via communication interface 280. The software instructions contained in main memory 230 may cause processing logic 220 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Although FIG. 2 shows exemplary components of network management device 110, in other embodiments, network management device 110 may contain fewer, different, or additional components than depicted in FIG. 2. In still other embodiments, one or more components of network management device 110 may perform one or more of the tasks described as being performed by one or more other components of network management device 110.

Figure 3:
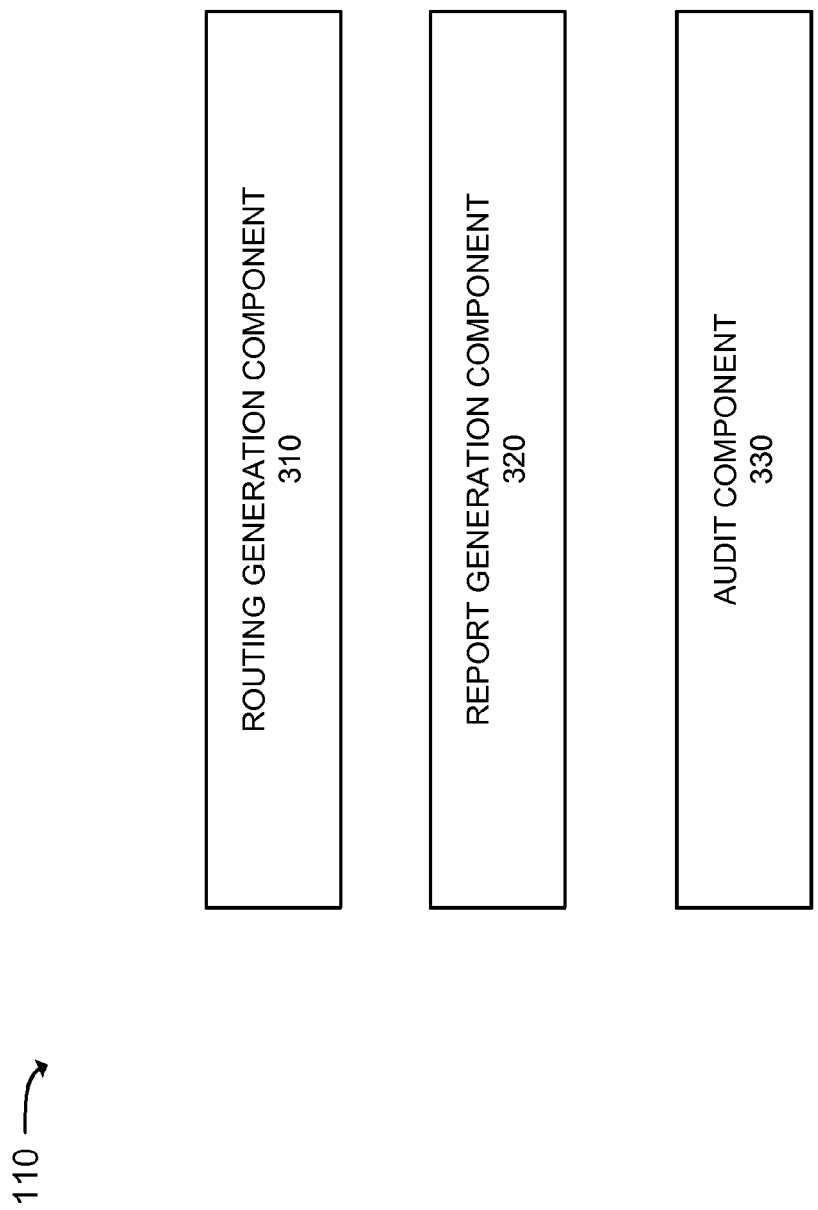
FIG. 3 is an exemplary functional block diagram of the network management device of FIG. 1 according to an exemplary embodiment.

FIG. 3 is an exemplary functional block diagram of network management device 110 according to an exemplary embodiment. As illustrated, network management device 110 may include a routing generation component 310, a report generation component 320, and an audit component 330.

Routing generation component 310 may receive new trunk information from a user (e.g., a user of user device 120) and may determine, based on the new trunk information, changes in routing in network 100. For example, routing generation component 310 may obtain current network topology and routing information and may determine changes in routing that would occur if the new trunk were installed. In one embodiment, routing generation component 310 may identify a virtual destination based on the new trunk information (e.g., in those situations where the new trunk information indicates that a DEOT trunk is being installed that homes to an end office). The virtual destination may, for example, represent a group of tandem switches, such as tandem switches 160, that home the same end office (e.g., end office 170) to which the new trunk homes. Routing generation component 310 may also generate a virtual destination name for the virtual destination that permits the user to easily identify a switch to which traffic is directed for the virtual destination, as will be described in greater detail below. The virtual destination name may allow the user to easily identify how traffic is routed to the end office to which the new trunk homes.

Report generation component 320 may receive routing information from routing generation component 310 and may generate, in response thereto, a report for the user that shows, for example, how traffic is routed through network 100 prior to the installation of the new trunk and how traffic is routed through network 100 after the installation of the new trunk. In one implementation, the report may include the virtual destination trunk name to allow the user to easily identify how traffic is routed to the end office to which the new trunk homes.

Audit component 330 may allow the user to audit the new routing configuration identified in the report generated by report generation component 320. The audit may simulate the routing of traffic through the new routing configuration to ensure that no round robins or dead ends exist in the new routing configuration.

Although FIG. 3 shows exemplary functional components of network management device 110, in other embodiments, network management device 110 may contain fewer, different, or additional functional components than depicted in FIG. 3. In still other embodiments, one or more functional components of network management device 110 may perform one or more of the tasks described as being performed by one or more other functional components of network management device 110.

Figure 4:
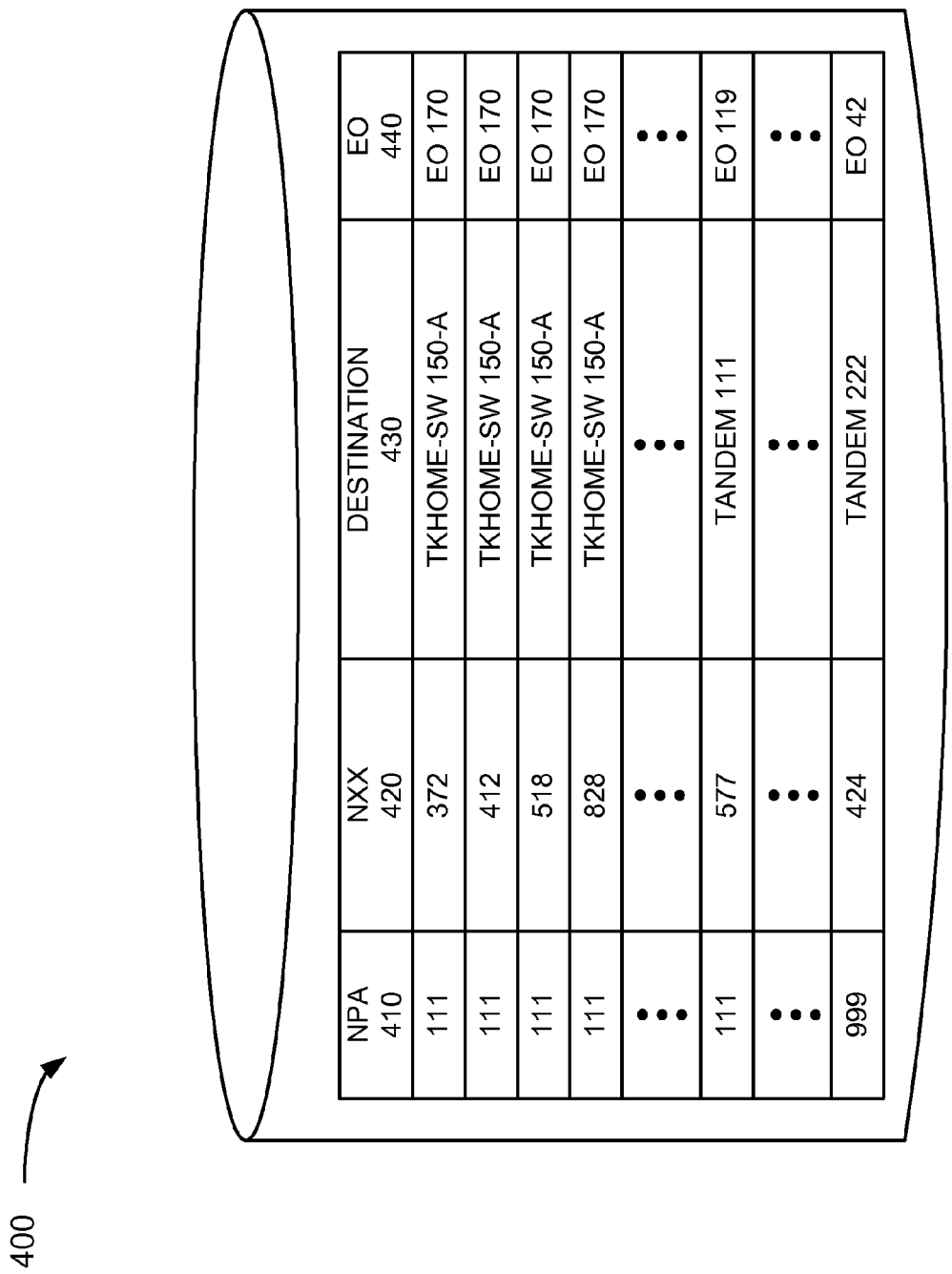
FIG. 4 is an exemplary diagram of a database that may be associated with the network management device of FIG. 1.

FIG. 4 is an exemplary diagram of a database 400 that may be associated with network management device 110 according to an exemplary embodiment. While only one database is described below, it will be appreciated that database 400 may include multiple databases stored locally at network management device 110, or stored at one or more different and possibly remote locations.

As illustrated, database 400 may include a group of entries in the following exemplary fields: a number planning area (NPA) field 410, an NXX field 420, a destination field 430, and an end office (EO) field 440. NPA field 410 may include information identifying a particular NPA (or area code) with which a telephone call may be associated. For example, for the telephone number 412-555-5555, the NPA may include "412." NXX field 420 may identify an NXX that is associated with the NPA in NPA field 410. In the example above, the NXX may include "555." Destination field 430 may include information identifying the device (e.g., a tandem switch) or virtual destination to which traffic for the NPA in NPA field 410 and the NXX in NXX field 420 is destined. For example, as illustrated in FIG. 4, telephone calls to telephone numbers having an NPA of "111" and an NXX of "372" may terminate at a virtual destination called "TKHOME-SW 150-A." As another example, telephone calls to telephone numbers having an NPA of "111" and an NXX of "577" may terminate at a tandem switched with a name of "TANDEM 111." End office field 440 may include information identifying an end office to which telephone calls for the NPA and NXX in field 410 and 420, respectively, are to be routed. In the example of FIG. 4, telephone calls to telephone numbers having an NPA of "111" and an NXX of "372" may be routed to end office 170.

Although FIG. 4 shows exemplary fields of database 400, in other embodiments, database 400 may contain fewer, different, or additional fields than depicted in FIG. 4.

Figure 5:
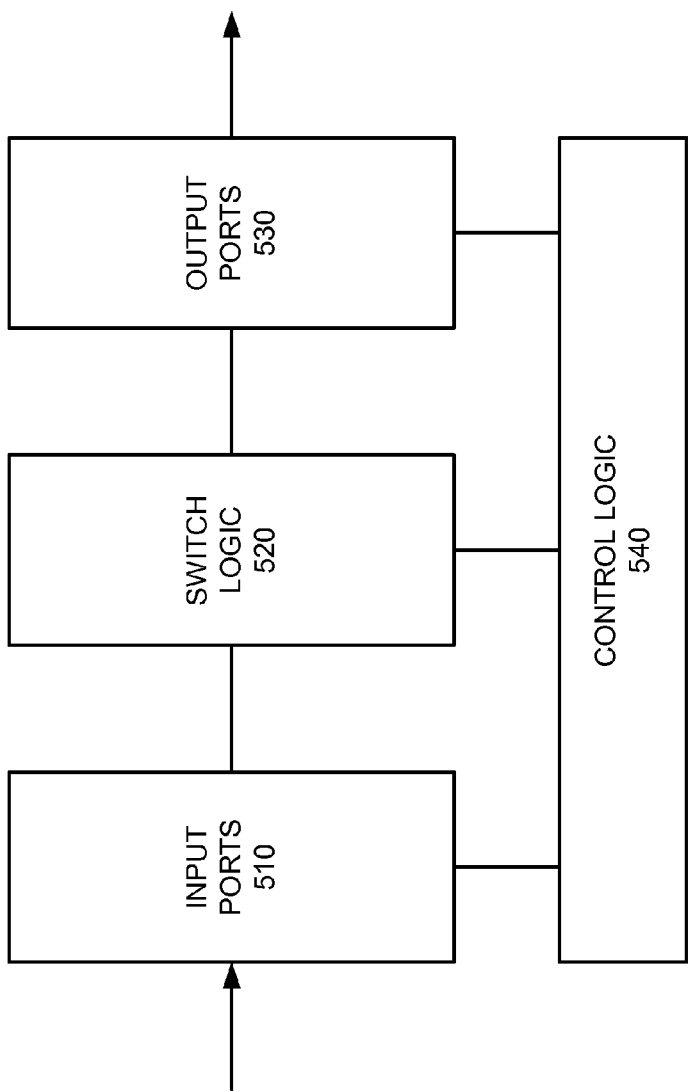
FIG. 5 is an exemplary block diagram of a portion of a long distance switch of FIG. 1.

FIG. 5 is an exemplary block diagram of a portion of long distance switch 145 according to an exemplary embodiment. Switches 150 and tandem switches 160 may be similarly configured. As illustrated, long distance switch 145 may include a group of input ports 510, switch logic 520, a group of output ports 530, and routing logic 540.

Input ports 510 may be the points of attachments for physical links (not shown) and may be the points of entry for incoming traffic and service requests (e.g., telephone calls). Switching logic 520 may interconnect input ports 510 with output ports 530. Switching logic 520 may be implemented using many different techniques. For example, switching logic 520 may include busses, crossbars, and/or shared memories. Output ports 530 may receive traffic and service requests from switching logic 520 and may output the traffic and service requests on one or more output links (not shown). Control unit 540 may use routing protocols and may create and/or maintain a switch table that is used in traffic and service request forwarding.

Although FIG. 5 shows exemplary components of long distance switch 145, in other embodiments, long distance switch 145 may contain fewer, different, or additional components than depicted in FIG. 5. In still other embodiments, one or more components of long distance switch 145 may perform one or more of the tasks described below as being performed by one or more other components of long distance switch 145.

FIG. 6 is an exemplary diagram of a portion of a computer-readable medium 600 that may be associated with long distance switch 145 according to an exemplary embodiment. While only one computer-readable medium is described below, it will be appreciated that computer-readable medium 600 may include multiple computer-readable media stored locally at long distance switch 145, or stored at one or more different and possibly remote locations.

As illustrated, computer-readable medium 600 may include a group of entries in the following exemplary fields: an NPA field 610, an NXX field 620, and a destination identification (ID) field 630. NPA field 610 may include information identifying a particular NPA (or area code) with which a telephone call may be associated. NXX field 620 may identify an NXX that is associated with the NPA in NPA field 610. Destination identification field 630 may include information identifying the device to which traffic for the NPA in NPA field 610 and the NXX in NXX field 620 is to be forwarded. For example, as illustrated in FIG. 6, telephone calls to telephone numbers having an NPA of "111" and an NXX of "372" are to be forwarded to SW 150-A. In contrast to the way the destination information is stored in database 400, the identification information stored in computer-readable medium 600 may be stored as a number (e.g., a network address) that represents switch 150-A.

Although FIG. 6 shows exemplary fields of computer-readable medium 600, in other embodiments, computer-readable medium 600 may contain fewer, different, or additional fields than depicted in FIG. 6.

Figure 7:
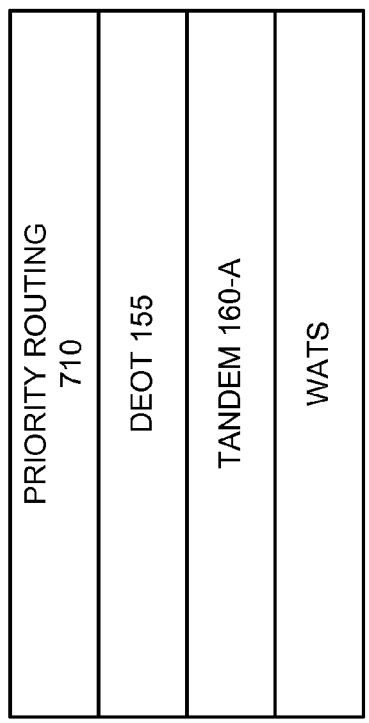
FIG. 7 is an exemplary diagram of a portion of a computer-readable medium that may be associated with a switch of FIG. 1.

FIG. 7 is an exemplary diagram of a portion of a computer-readable medium 700 that may be associated with a switch, such as switch 150-A, according to an exemplary embodiment. While only one computer-readable medium is described below, it will be appreciated that computer-readable medium 700 may include multiple computer-readable media stored locally at switch 150-A, or stored at one or more different and possibly remote locations.

As illustrated, computer-readable medium 700 may include a group of entries in the following exemplary field: a priority routing field 710. Priority routing field 710 may include information describing the order in which switch 150-A is to route traffic to end office 170. In the example illustrated in FIG. 7, switch 150-A is to route traffic over DEOT 155. If routing via DEOT 155 is not possible, switch 150-A is to route traffic to tandem switch 160-A. If routing via tandem switch 160-A is not possible, switch 150-A is to route traffic via a Wide Area Transport Service (WATS).

Although FIG. 7 shows an exemplary field of computer-readable medium 700, in other embodiments, computer-readable medium 700 may contain fewer, different, or additional fields than depicted in FIG. 7.

Figure 8:
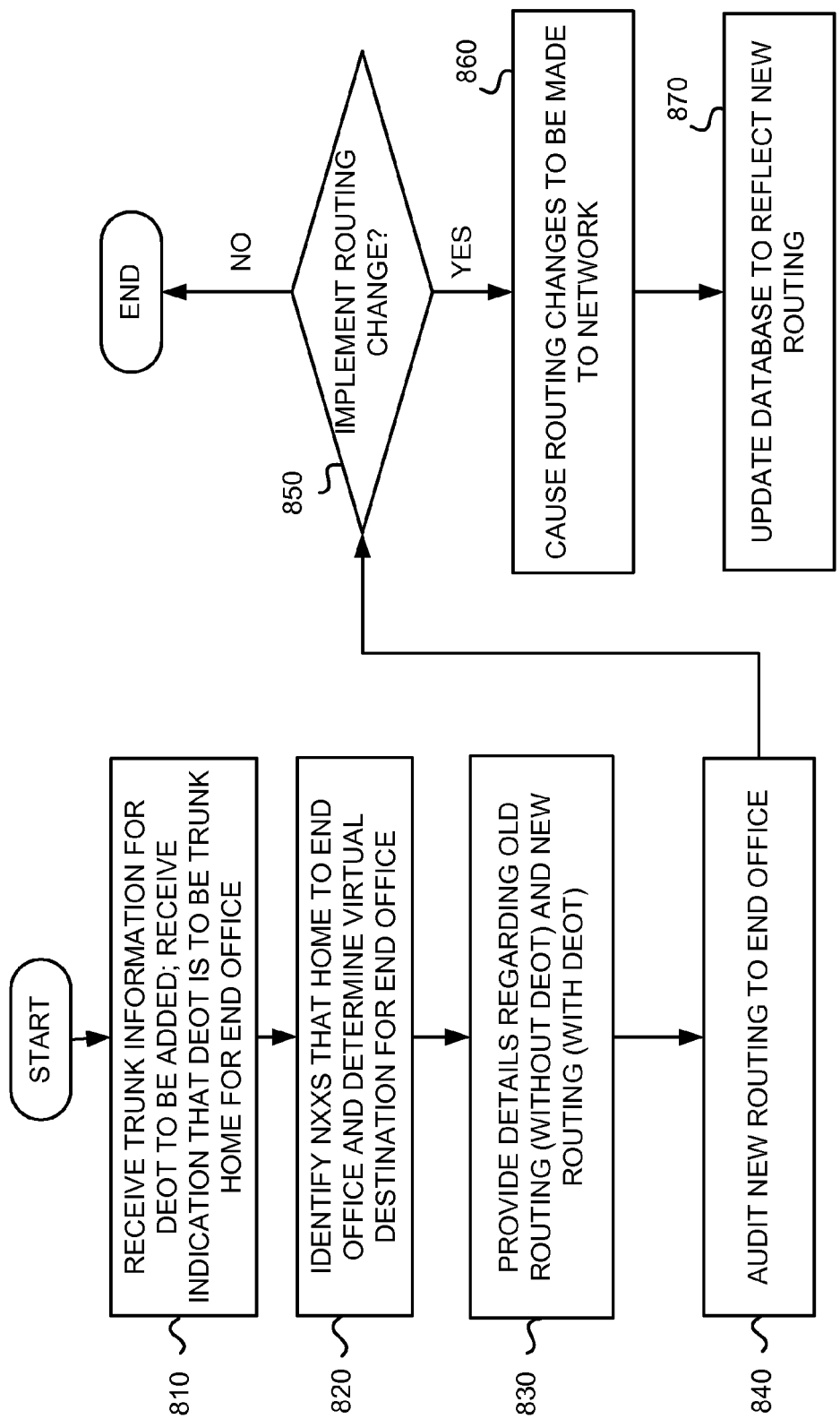
FIG. 8 is a flowchart of an exemplary process for changing network routing according to an exemplary embodiment.

FIG. 8 is a flowchart of an exemplary process for changing network routing according to an exemplary embodiment. In one embodiment, the processing of FIG. 8 may be performed by network management device 110. In another embodiment, some or all of the processing described below may be performed by another device including or excluding network management device 110.

Processing may begin with network management device 110 receiving trunk information for a new DEOT to be added to network 100 (block 810). Network management device 110 may also receive information identifying the new DEOT as a trunk home (block 810). Network management device 110 may receive the trunk information and the trunk home information from a user of a user device, such as user device 120.

Figure 9:
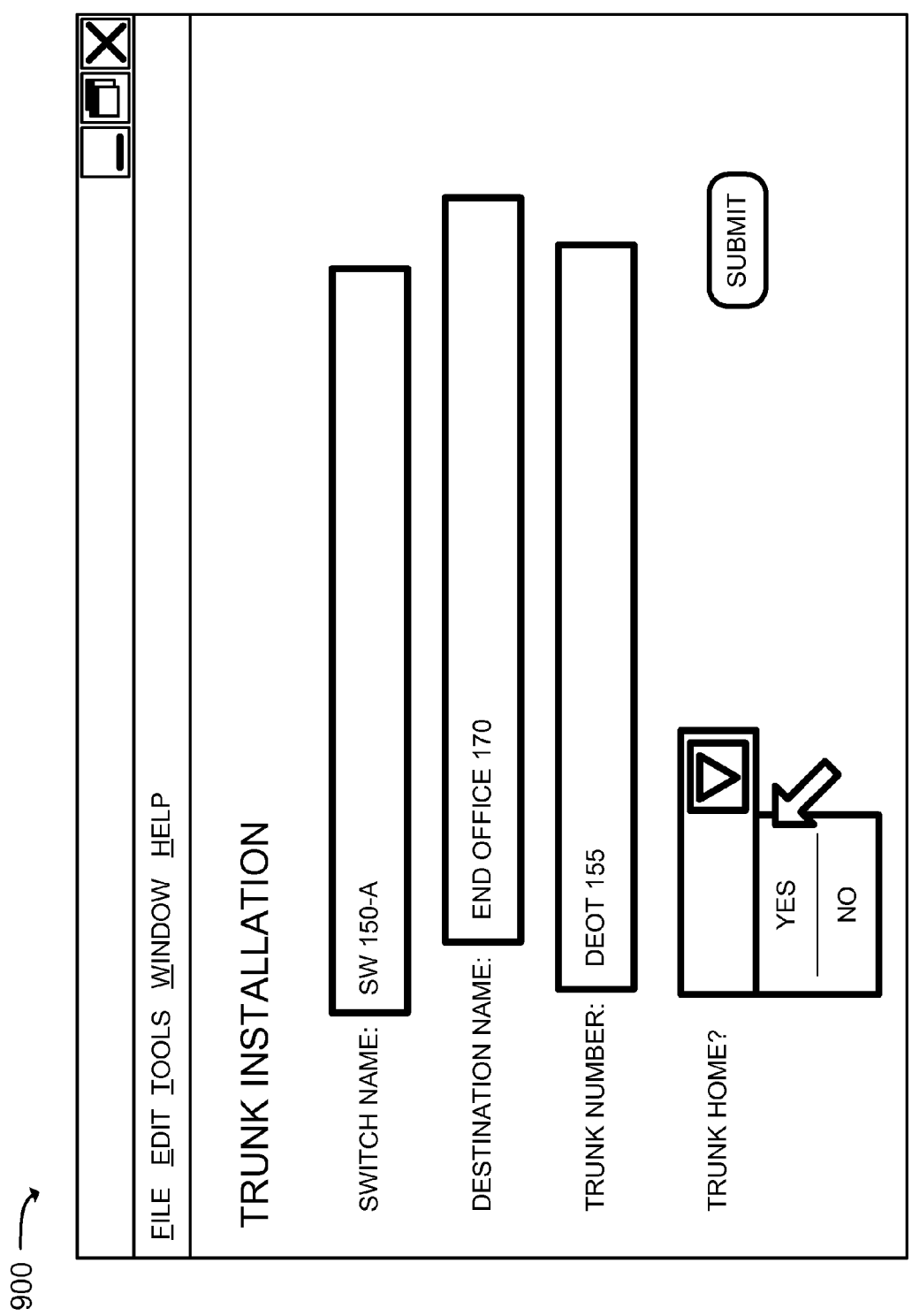

In one embodiment, network management device 110 may provide a graphical user interface (GUI) to user device 120 in response to, for example, the user properly logging onto network management device 110. FIG. 9 illustrates an exemplary GUI 900 that may be provided to a user according to one embodiment. As illustrated, GUI 900 may allow the user to identify a switch associated with the DEOT to be added. The user may enter a name for the switch according to the Local Exchange Routing Guide (LERG) or may enter other information identifying the switch. GUI 900 may also allow the user to enter the identity of the end office to which the DEOT will home. The user may enter a name for the end office according to LERG or may enter other information identifying the end office that will be the destination of the DEOT. GUI 900 may further allow the user to enter information identifying the DEOT to be added. The user may enter, for example, a number or other information identifying the DEOT. GUI 900 may further allow the user to indicate that the DEOT is a trunk home for the end office.

In the example illustrated in FIG. 9, the user may indicate that a trunk, called DEOT 155, is to be added between switch SW 150-A and end office 170 and that DEOT 155 is a trunk home for end office 170. It will be appreciated that GUI 900 may allow the user to provide fewer, different, or additional information than depicted in FIG. 9.

Returning to the processing described in FIG. 8, network management device 110 (e.g., routing generation component 310) may identify the NXXs that home to the end office to which the new DEOT will connect (block 820). Network management device 110 may access a database, such as database 400, that stores network topology and routing information to identify the NXXs that home to the appropriate end office.

Network management device 110 (e.g., routing generation component 310) may further identify a virtual destination for the end office (block 820). In one embodiment, network management device 110 may access a database, such as database 400, and may identify the tandem switches with which the identified NXXs are associated. Network management device 110 may group the identified tandem switches as a virtual destination for the NXXs that home to the end office. For example, in the exemplary network 100 illustrated in FIG. 1, network management device 110 may identify tandem switches 160 as a virtual destination for end office 170.

Network management device 110 (e.g., routing generation component 310) may create a name for the new virtual destination. The name may include information that will allow a user to readily identify the switch (e.g., switch 150-A) to which traffic will be routed for the virtual destination. In one embodiment, the name may be represented as "TKHOME—SWITCH NAME," where TKHOME may indicate that the virtual destination is a trunk home for the end office and SWITCH NAME may indicate the name of the switch (e.g., the LERG name or another type of identifier). For example, in the exemplary configuration illustrated in FIG. 1, the virtual destination may be named "TKHOME—SW 150-A," assuming that "SW 150-A" is the LERG name (or another type of identifier) for switch 150-A.

Network management device 110 may provide details regarding the old routing in network 100 (routing without the new DEOT) and new routing (routing with the new DEOT in place) (block 830). For example, in one exemplary embodiment, network management device 110 (e.g., report generation component 320) may create a report that shows how each switch in long distance network 140 will be changed based on the addition of the new DEOT. The report may include information regarding how each switch currently routes traffic for the particular NPA(s)/NXX(s) affected by the new DEOT and how the switches will route traffic for the NPA(s)/NXX(s) after the new DEOT is installed.

FIG. 10 illustrates an exemplary GUI 1000 that may be provided to a user according to one embodiment. As illustrated, GUI 1000 may provide a trunk installation report that shows what changes will be made in the network upon installation of the new DEOT. For example, the trunk installation report may provide changes that will be made to every long distance switch in long distance network 140 and any other switches outside of long distance network 140 for which changes will be made. The exemplary portion of the trunk installation report provided in GUI 1000 may include a section 1010 that shows changes that will be made to long distance switch 145 and a section 1020 that shows changes that will be made to switch 150-A.

As illustrated in FIG. 10, three changes will be made to long distance switch 145 upon installation of the new DEOT. For example, for an NPA equal to "111" and an NXX equal to "518" or "828," long distance switch 145 will no longer route telephone calls for these NPA/NXXs to switch 150-A for routing to tandem switch 160-A. Instead, long distance switch 145 will route telephone calls for these NPA/NXXs to the virtual destination "TKHOME-SW 150-A," which indicates that switch 150-A is a trunk home for these telephone calls and that these telephone calls will be routed to switch 150-A for routing over the new DEOT. For an NPA equal to "111" and an NXX equal to "372," "444," "819," or "820," long distance switch 145 will no longer route telephone calls for these NPA/NXXs to switch 150-B for routing to tandem switch 160-B. Instead, long distance switch 145 will also route telephone calls for these NPA/NXXs to the virtual destination "TKHOME-SW 150-A." For an NPA equal to "111" and an NXX equal to "154," "222," or "234," long distance switch 145 will no longer route telephone calls for these NPA/NXXs to switch 150-B for routing to tandem switch 160-C. Instead, long distance switch 145 will also route telephone calls for these NPA/NXXs to the virtual destination "TKHOME-SW 150-A."

As further illustrated in FIG. 10, the following exemplary change will be made to switch 150-A upon installation of the new DEOT. For an NPA equal to "111" and an NXX equal to "154," "222," "234," "372," "444," "518," "819," "820," or "828," switch 150-A will no longer route telephone calls for these NPA/NXXs in the following order: tandem switch 160-A and then WATS. Instead, switch 150-A will route telephone calls for these NPA/NXXs in the following order: the new DEOT, tandem switch 160-A, and then WATS.

Thus, the trunk installation report may show the user some or all of the changes that will be made in network 100 upon installation of the new DEOT using LERG names (or another type of identifier) and virtual destination names, as opposed to network addresses. In this way, the user may easily identify how traffic will be routed upon installation of a new DEOT.

GUI 1000 may further provide a back button 1030 that may allow the user to cancel the installation of the new DEOT or go back to a previous GUI to make changes to information that has been entered. GUI 1000 may also provide a run audit button 1040 that allows the user to perform an audit of the new network routing configuration provided in the trunk installation report. It will be appreciated that GUI 1000 may provide fewer, different, or additional information than depicted in FIG. 10.

Returning to the processing described in FIG. 8, network management device 110 (e.g., audit component 330) may perform an audit of the new network routing configuration (block 840). As indicated above, the user may begin the audit by selecting run audit button 1040 in GUI 1000. Other ways of initiating the audit may alternatively be used. The audit may involve, for example, simulating the transmission of traffic through the network based on the new network routing configuration provided in the trunk installation report. The audit may determine whether round robins or dead ends have been created in network 100 based on the new network routing configuration.

Figure 11:
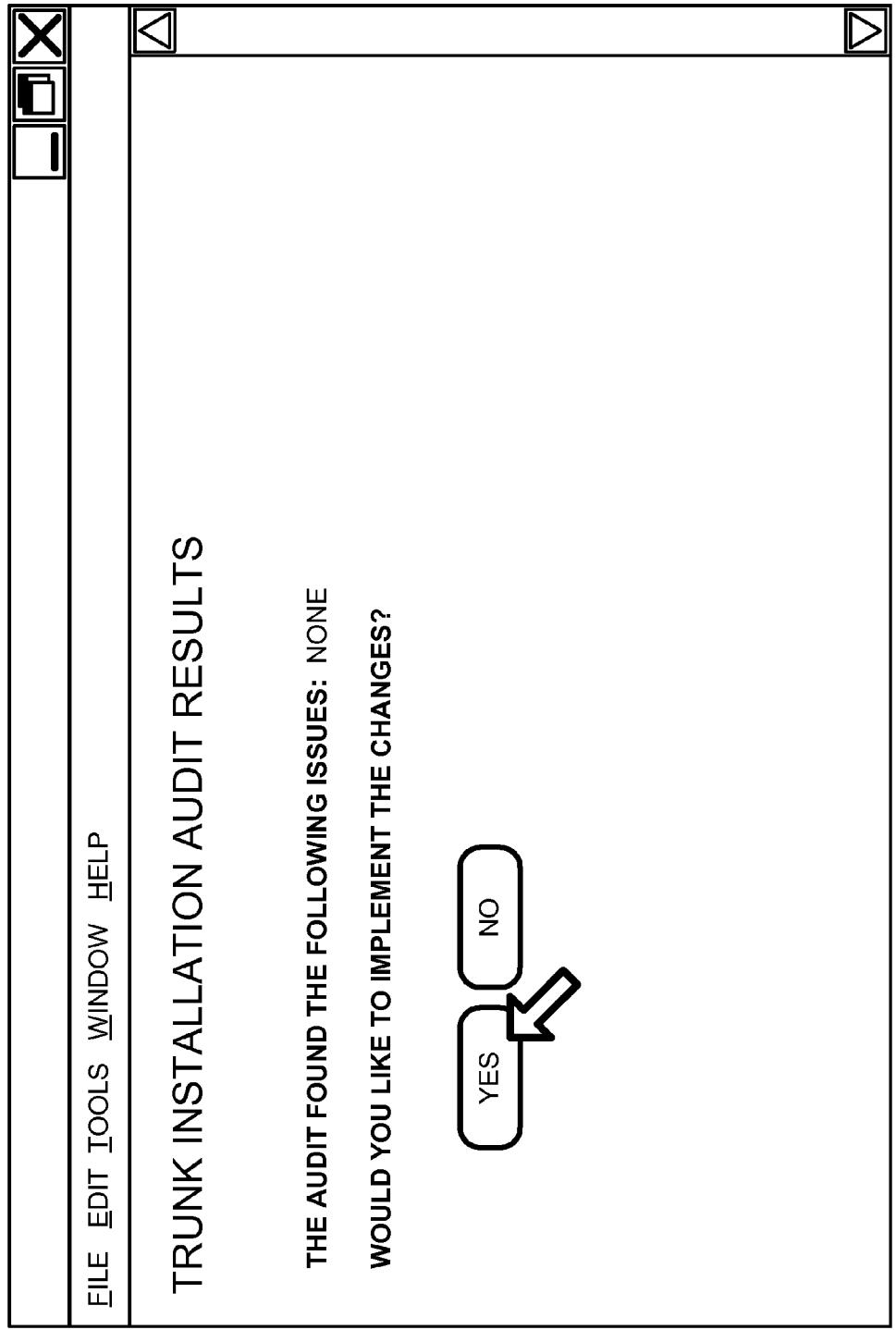

Upon performance of the audit, network management device 110 may provide the user with the results of the audit and may determine whether to implement the changes in the trunk installation report (block 850). FIG. 11 illustrates an exemplary GUI 1100 that may be provided to a user according to one embodiment. As illustrated, GUI 1100 may provide the user with a list of issues that were identified in the audit. GUI 1100 may also allow the user to indicate whether the user would like to make the changes indicated in the trunk installation report. For example, the user may indicate that the changes are not to be implemented in network 100 by selecting the "NO" button in GUI 1100. The user may also indicate that the changes are to be implemented in network 100 by selecting the "YES" button in GUI 1100. Other ways of initiating the changes to the network may alternatively be used.

If the user does not want to the changes to be implemented (e.g., the user selects the "NO" button in GUI 1100) (block 850—NO), processing may end. In one implementation, network management device 110 may return the user to an initial introductory screen or to GUI 900, where the user may begin the trunk installation process again. If, on the other hand, the user wants to implement the changes in the network (e.g., the user selects the "YES" button in GUI 1100) (block 850—YES), network management device 110 may cause the changes to be implemented in network 100 (block 860). Network management device 110 may send the routing changes (identified in the trunk installation report i.e., the changes to be made to the long distance switches and switch 150-A) to the switches in the network in order to reconfigure the routing of these switches. In one exemplary embodiment, network management device 110 (or another device) may convert the routing changes from one format to another format prior to sending the routing changes to the switches.

In another exemplary embodiment, network management device 110 may send the routing changes to another device for updating the switches. For example, in one embodiment, network management device 110 may send the routing changes (or a converted version of the routing changes) to a transport system, which may log into every switch (e.g., long distance switches 145 in long distance network 140 and switch 150-A) simultaneously and may download the routing changes to network 100. For example, the transport system may cause the switches in long distance network 140 (e.g., including long distance switch 145) to route telephone calls for the NXXs that home to end office 170 to switch 150-A (the trunk home for end office 170). The transport system may, for example, also cause the routing priority of switch 150-A to change so that traffic received at switch 150-A is routed over the new DEOT first, to tandem switch 160-A second, and then to WATS third.

Upon completion of the routing changes to network 100, the transport system may notify network management device 110 that the routing change has been successfully completed. In this way, every NXX that homes to end office 170 receives a new set of routing instructions and those instructions direct traffic for those NXXs to switch 150-A, which is associated with the new trunk home for end office 170.

Network management device 110 may, in response to receiving a notification that network 100 has been updated to reflect the routing changes, update a database to reflect the changes (block 870). For example, network management device 110 may update database 400 to indicate that the destination of the NXXs that home to end office 170 is the virtual destination—TKHOME-SW 150-A. If database 400 is subsequently accessed for network configuration and/or network troubleshooting purposes, a user may readily identify that traffic destined for end office 170 is routed to switch 150-A.

Routing traffic over a DEOT may be cheaper for a long distance provider than routing traffic to an end office via a tandem switch. Thus, by routing all traffic for end office 170 to switch 150-A for routing over DEOT 155, the cost to the long distance provider may be reduced.

Figure 12:
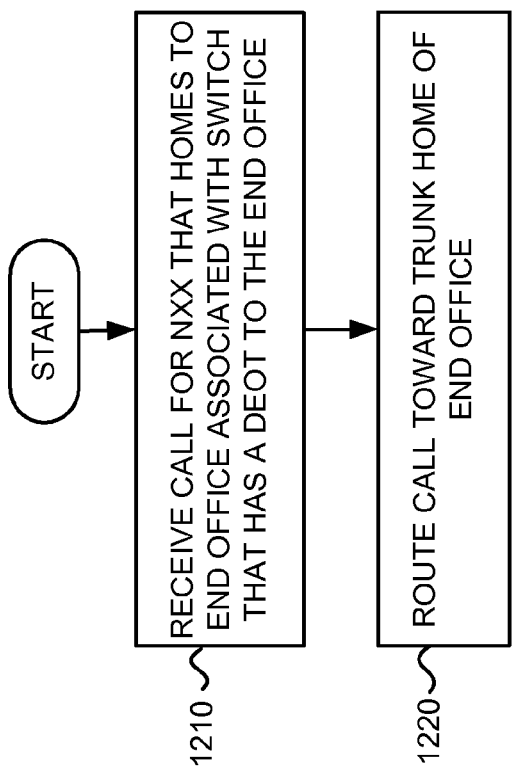
FIG. 12 is a flow chart of an exemplary process for routing traffic in a network after a new direct end office trunk has been installed.

FIG. 12 is a flow chart of an exemplary process for routing traffic in a network after a new DEOT has been installed. The processing of FIG. 12 may be performed by long distance switch 145 (or another long distance switch in long distance network 140). Assume that the processing described above with respect to FIG. 8 has been performed and long distance switch 145 has been updated to route telephone calls for all NXXs that home to end office 170 to switch 150-A (the trunk home for end office 170). Processing may begin with long distance switch 145 receiving a telephone call for an NXX that homes to end office 170 (block 1210). For example, assume that the telephone call is for NPA "111" and NXX "372," which homes to end office 170. Long distance switch 145 may lookup the NPA/NXX for the telephone call (e.g., in a computer-readable medium, such as computer-readable medium 600), and may determine that the telephone call is to be routed to switch 150-A.

Long distance switch 145 may route the telephone call toward switch 150-A (the trunk home of end office 170 (block 1220). To route the telephone call toward switch 150-A, long distance switch 145 may output the telephone call on an appropriate output port 530 of long distance switch 145.

Figure 13A:
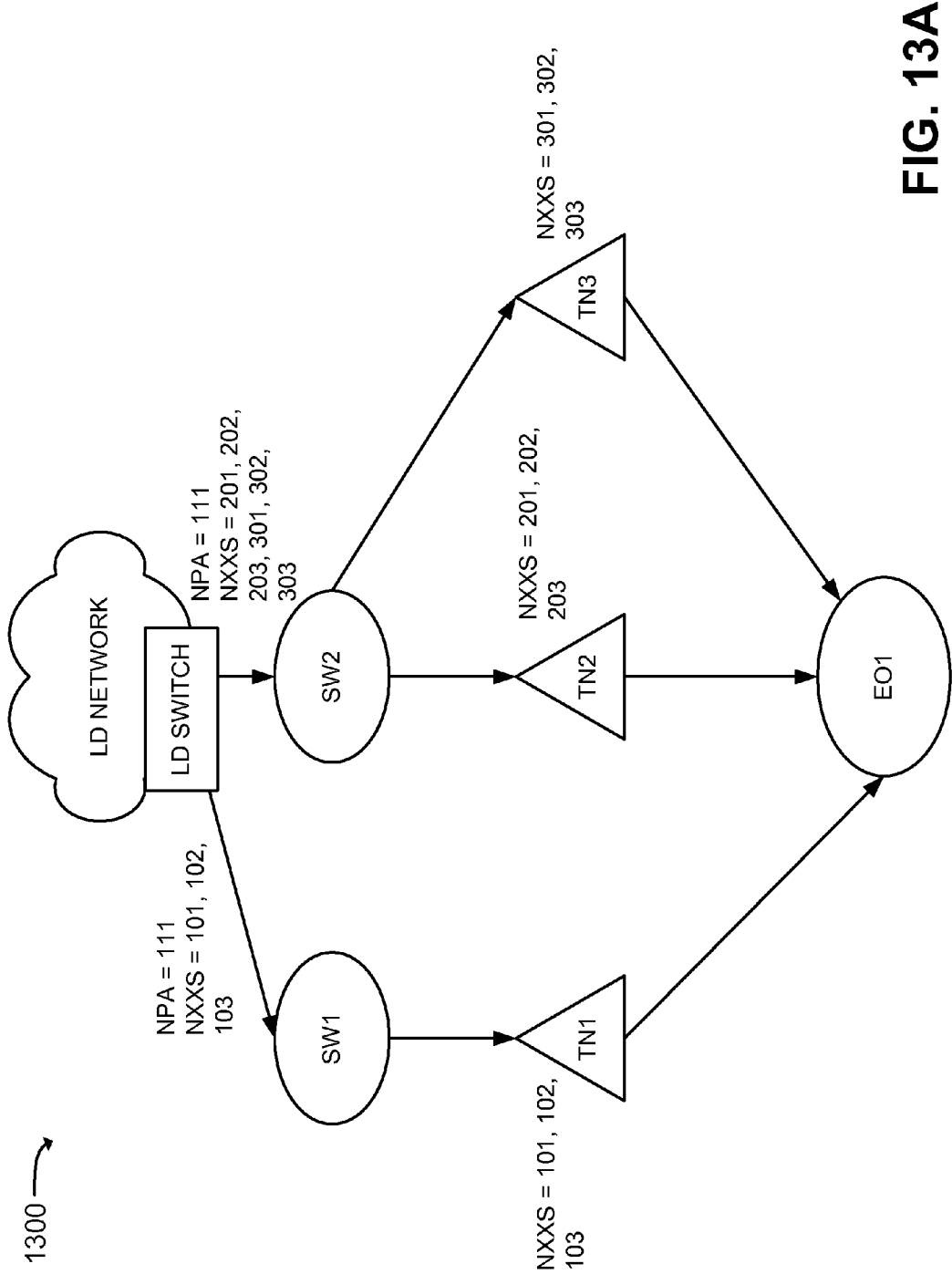

The following example 1300 of FIGS. 13A-13H illustrates the processing described above with respect to FIGS. 8 and 12. With reference to FIG. 13A, assume that a portion of network includes a long distance (LD) network (e.g., long distance network 140), a long distance switch (e.g., long distance switch 145), two class 3 switches SW1 and SW2 (e.g., switches 150), three tandem switches TN1, TN2, and TN3 (e.g., tandem switches 160), and an end office EO1 (e.g., end office 170). In this example, assume further that telephone calls to NPA "111" and NXXs "101," "102," and "103" are routed from the long distance switch to end office EO1 through switch SW1 and tandem switch TN1; telephone calls to NPA "111" and NXXs "201," "202," and "203" are routed from the long distance switch to end office EO1 through switch SW2 and tandem switch TN2; and telephone calls to NPA "111" and NXXs "301," "302," and "303" are routed from the long distance switch to end office EO1 through switch SW2 and tandem switch TN3.

Figure 13B:
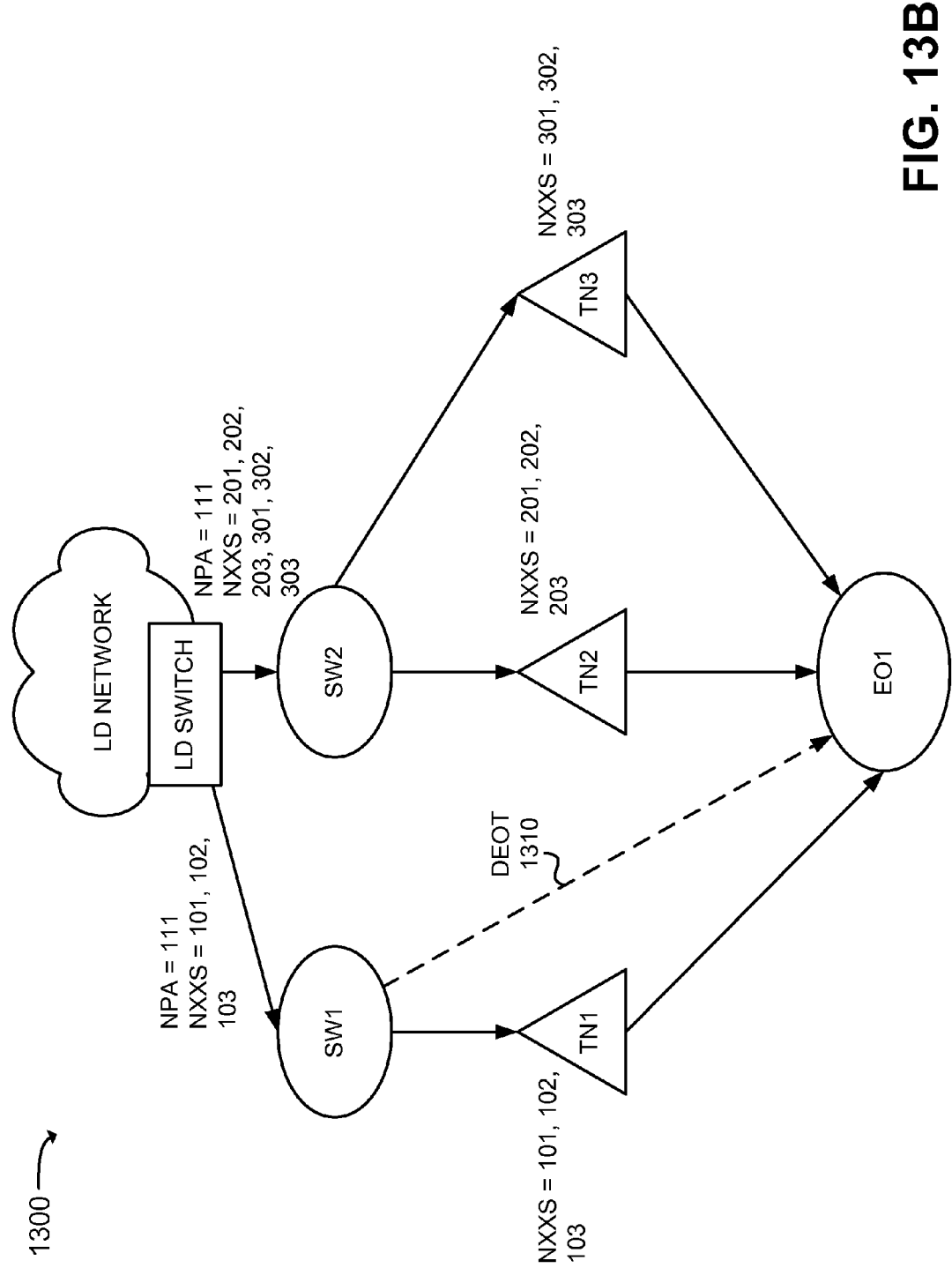
Figure 13C:
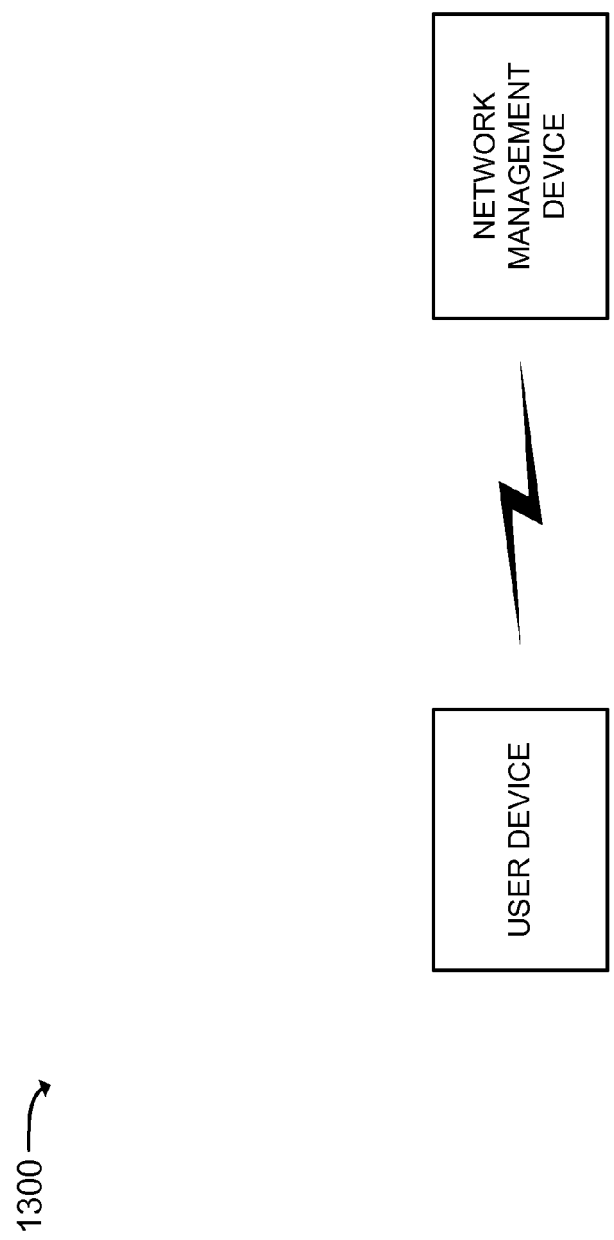

Now with reference to FIG. 13B, assume that a new DEOT 1310 is installed between switch SW1 and end office EO1, as indicated by the dotted line. To take advantage of the presence of DEOT 1310 in the network, a user may desire to change the routing of the network. To do so, the user, using a user device (e.g., user device 120), may interact with a network management device (e.g., network management device 110) in the manner described above with respect to FIG. 8, as illustrated in FIG. 13C. For example, the user may log into the network management device. Once logged in, the network management device may provide one or more graphical user interfaces to the user at the user device to facilitate changing the routing of traffic in the network. For example, as illustrated in FIG. 13D, the network management device may provide a trunk installation graphical user interface that allows the user to specify that DEOT 1310 is being installed between switch SW1 and end office EO1. Moreover, the graphical user interface may allow the user to identify a number for the DEOT (called DEOT 1310 in this example) and indicate that this DEOT is a trunk home for end office EO1. Assume that that user enters the information illustrated in FIG. 13D and selects the submit button.

The network management device may identify all of the NXXs that home to end office EO1. In this example, the NXXs would include "101," "102," "103," "201," "202," "203," "301," "302," and "303" for NPA "111." The network management device may automatically create a virtual destination for these NXXs. In this example, the virtual destination would be TKHOME-SW1, indicating that switch SW1 is the trunk home for end office EO1.

Figure 13E:
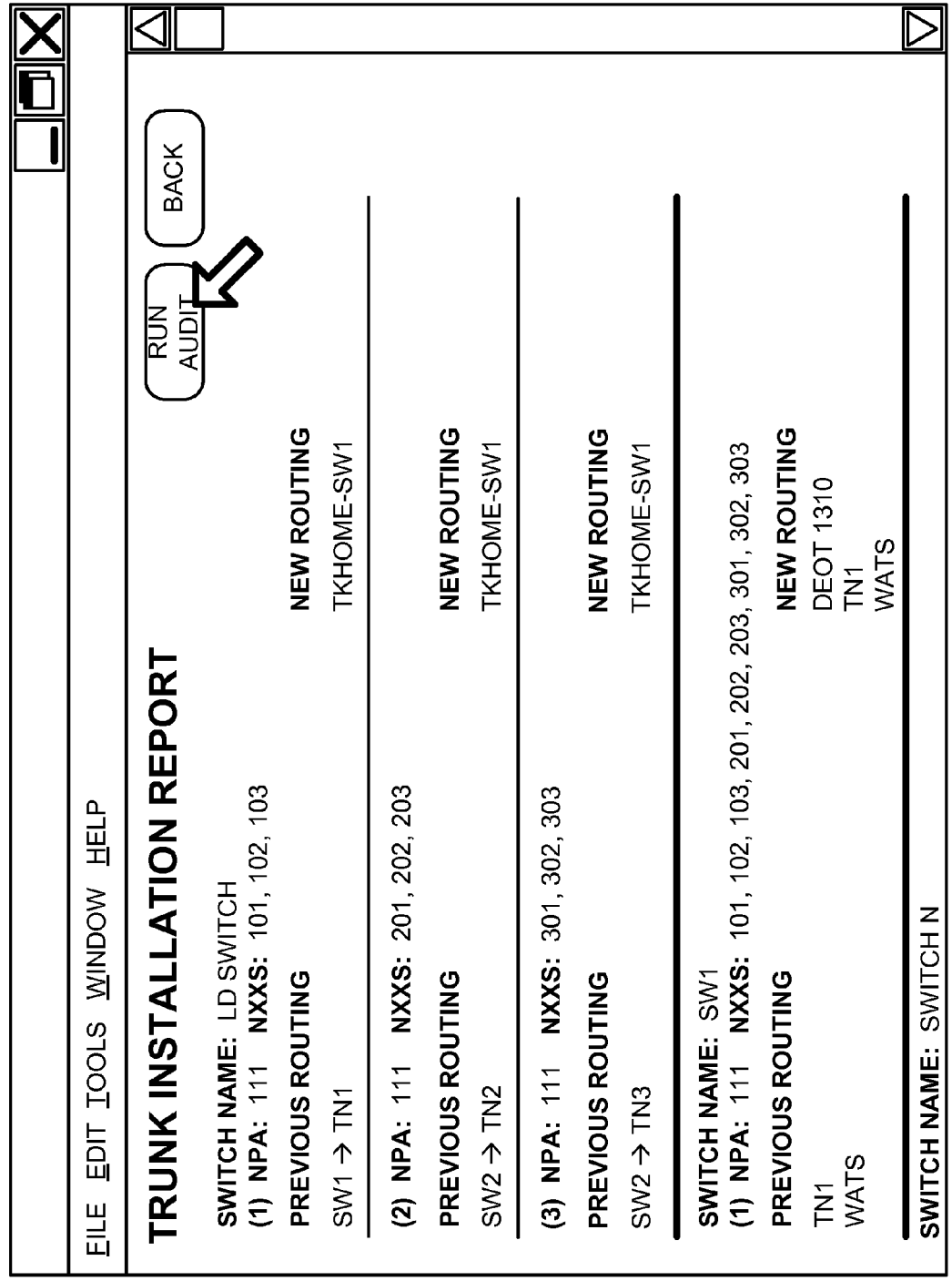

The network management device may provide a report to the user of the user device indicating the changes that will be made in the network based on the installation of new DEOT 1310. For example, as illustrated in FIG. 13E, the network management device may provide a trunk installation report that provides the user with information regarding all of the changes that will occur in the network based on the installation of DEOT 1310. The trunk installation report may provide information regarding how a particular network device routes traffic prior to the installation of DEOT 1310 and how the particular network device will route traffic after installation of DEOT 1310.

As illustrated in the exemplary portion of the trunk installation report shown in FIG. 13E, for an NPA equal to "111" and an NXX equal to "101," "102," or "103," the long distance switch will no longer route telephone calls for these NPA/NXXs to switch SW1 for routing to tandem switch TN1. Instead, the long distance switch will route telephone calls for these NPA/NXXs to the virtual destination "TKHOME-SW1," which indicates that switch SW1 is a trunk home for these telephone calls and that these telephone calls will be routed to switch SW1 for routing over new DEOT 1310. For an NPA equal to "111" and an NXX equal to "201," "202," or "203," the long distance switch will no longer route telephone calls for these NPA/NXXs to switch SW2 for routing to tandem switch TN2. Instead, the long distance switch will route telephone calls for these NPA/NXXs to the virtual destination "TKHOME-SW1." For an NPA equal to "111" and an NXX equal to "301," "302," or "303," the long distance switch will no longer route telephone calls for these NPA/NXXs to switch SW2 for routing to tandem switch TN3. Instead, the long distance switch will route telephone calls for these NPA/NXXs to the virtual destination "TKHOME-SW1."

As further illustrated in FIG. 13E, the following exemplary change may be made to switch SW1 upon installation of new DEOT 1310. For an NPA equal to "111" and an NXX equal to "101," "102," "103," "201," "202," "203," "301," "302," or "303," switch SW1 will no longer route telephone calls for these NPA/NXXs in the following order: tandem switch TN1 and then WATS. Instead, switch SW1 will route telephone calls for these NPA/NXXs in the following order: new DEOT 1310, tandem switch TN1, and then WATS.

Figure 13F:
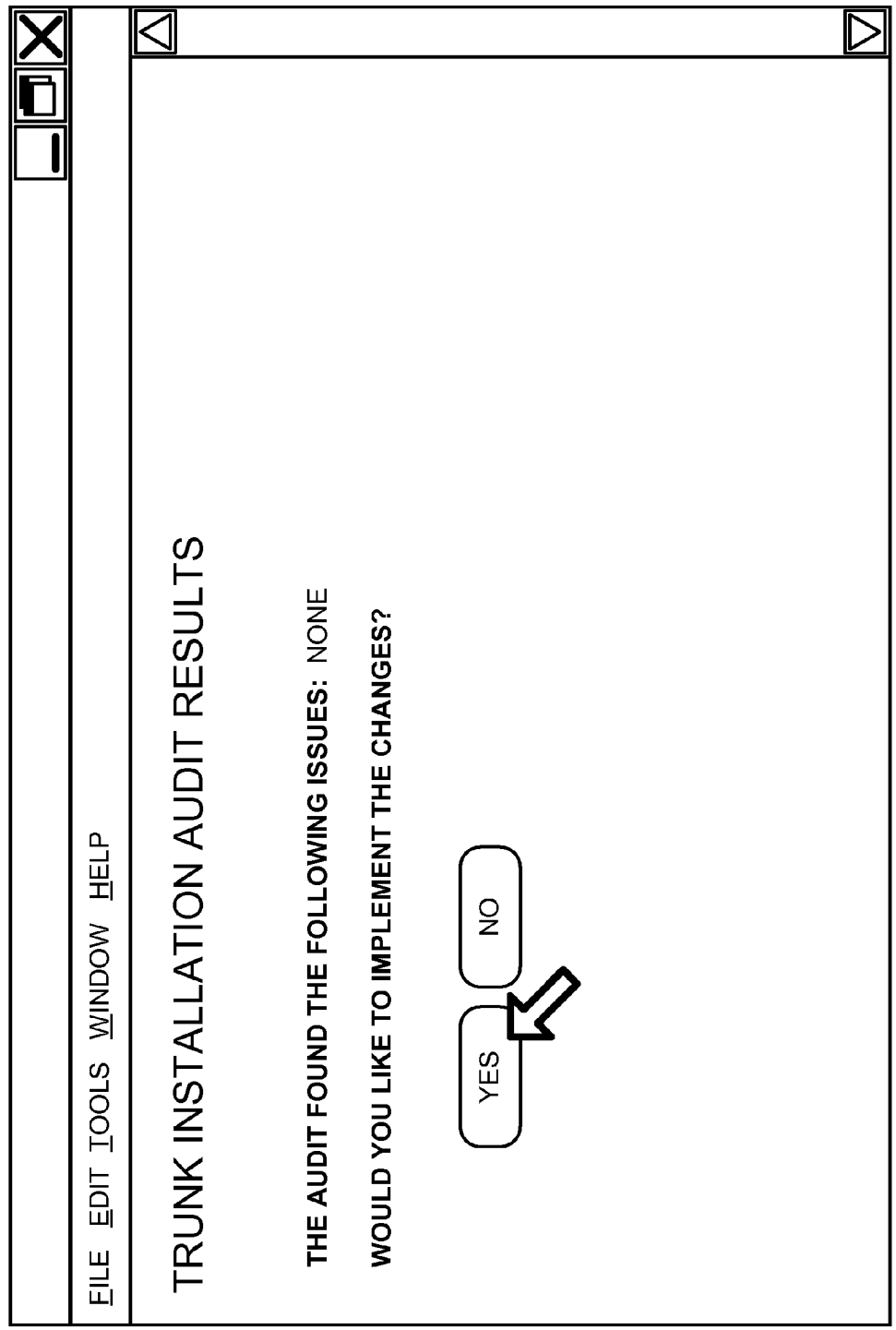

If the user is satisfied with the changes provided in the trunk installation report, the user may perform an audit of the network. For example, the user may select the run audit button in the trunk installation report to initiate the audit. As indicated above, the network management device may simulate transmission of traffic through the network with the network routing changes in place. Via the audit, the network management device may determine whether round robins or dead ends exist in the network with the network routing changes in place. The network management device may provide the results of the audit to the user. For example, as illustrated in FIG. 13F, the network management device may provide an indication of whether any issues were identified during the audit. If an issue was identified, the network management device may provide information regarding the issue to the user. In the exemplary graphical user interface depicted in FIG. 13F, the network management device may indicate that no issues were found during the audit. If the user is satisfied with the audit results, the user may elect to implement the network routing changes by selecting, for example, the YES button.

Figure 13G:
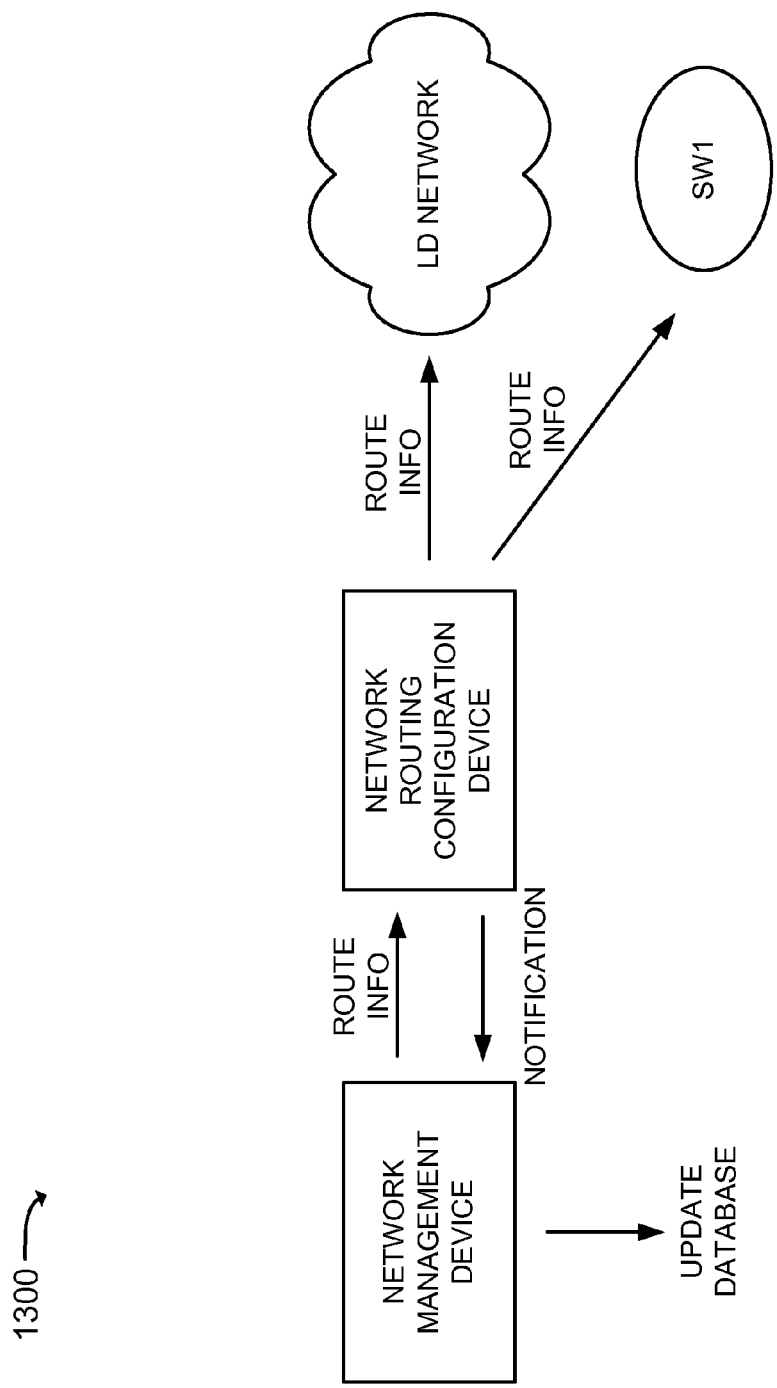

Upon detecting that the user wants to implement the network routing changes, the network management device may transmit information relating to the network routing changes to a network routing configuration device, such as a transport system, as illustrated in FIG. 13G. As indicated above, the network management device may convert the network routing changes from a first format to a second, different format prior to transmitting the network routing changes to the network routing configuration device. Alternatively, the network routing configuration device (or another device) may convert the network routing changes from a first format to a second, different format prior to downloading the network routing changes to the appropriate network devices. The network routing configuration device may connect to each of the long distance switches in the long distance network and to switch SW1. The network routing configuration device may download the network routing changes to the long distance switches and switch SW1. Upon downloading the network routing changes, the network routing configuration device may notify the network management device that the long distance switches and switch SW1 have been successfully updated with the network routing changes. The network management device may update a database to reflect the changes that have been made to the network.

Figure 13H:
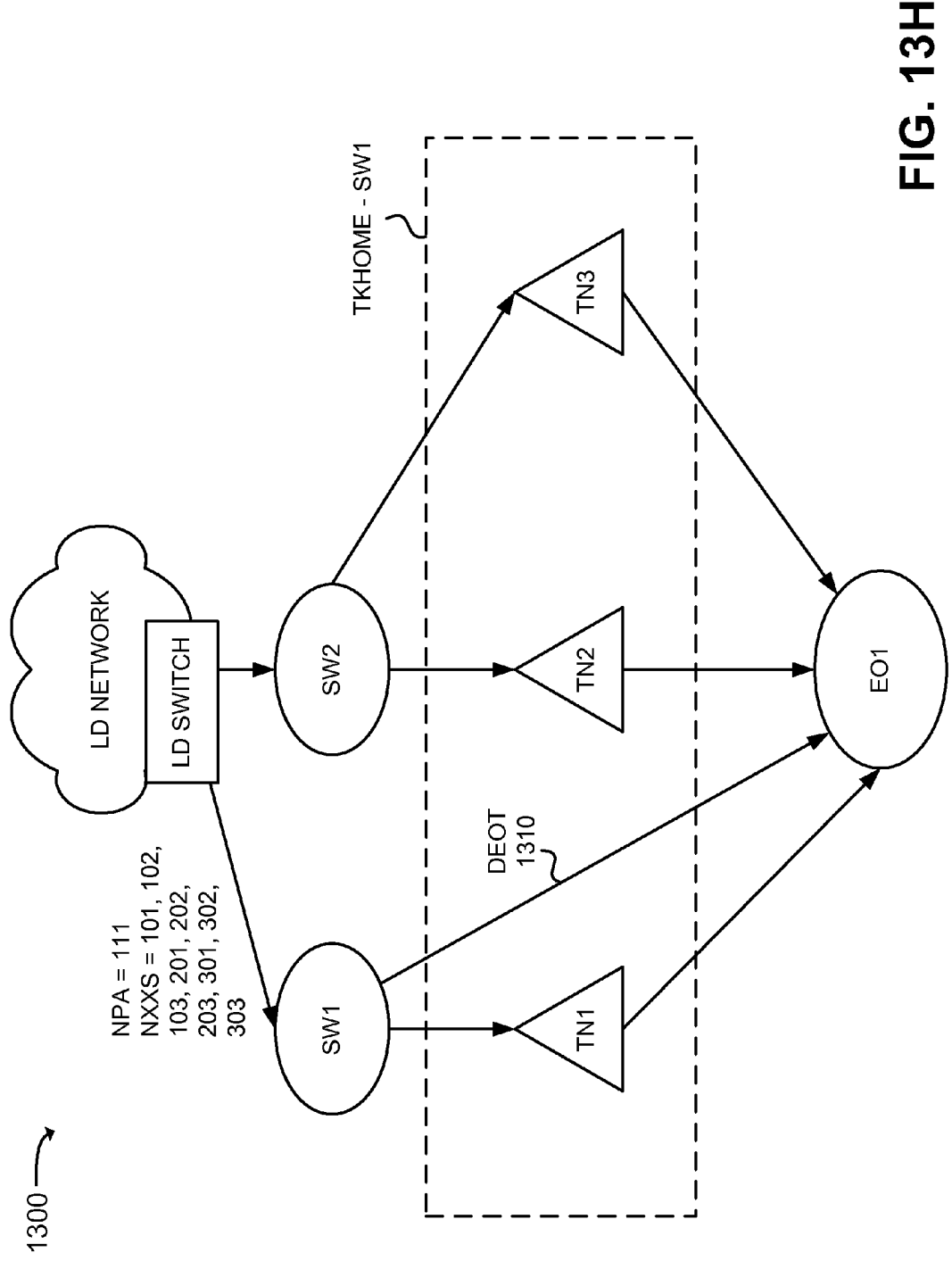

Thereafter, when a long distance switch receives a telephone call for NPA "111" and NXX "101," "102," "103," "201," "202," "203," "301," "302," or "303," the long distance switch may route the telephone call to switch SW1, as indicated in FIG. 13H. Upon receipt of the telephone call, switch SW1 may route the telephone call to end office EO1 over DEOT 1310. In this way, traffic may be transmitted to end office EO1 more cheaply than prior techniques.

Figure 14A:
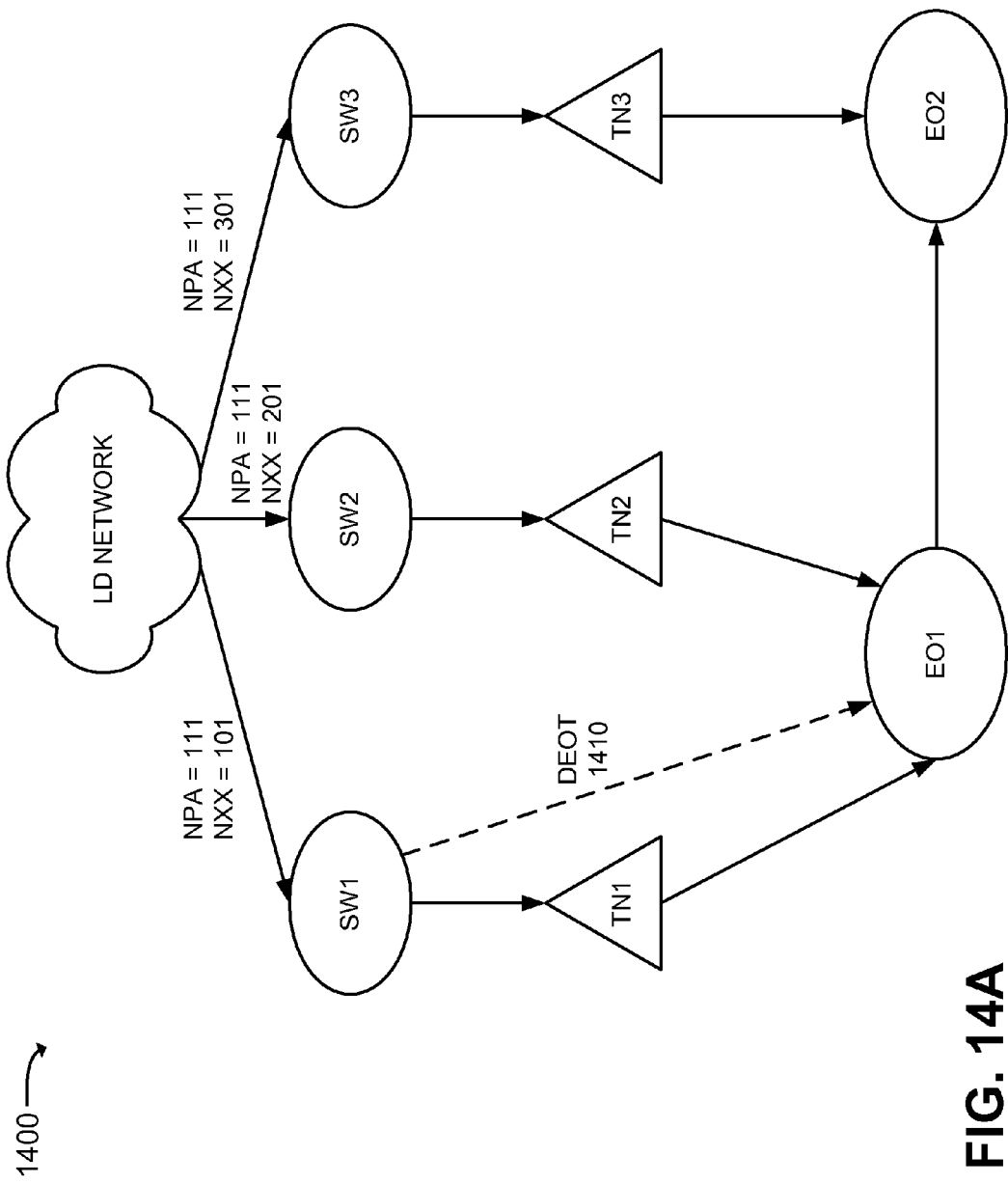
FIGS. 14A and 14B illustrate an example of a virtual destination in a situation where a first end office homes to a second end office.
Figure 14B:
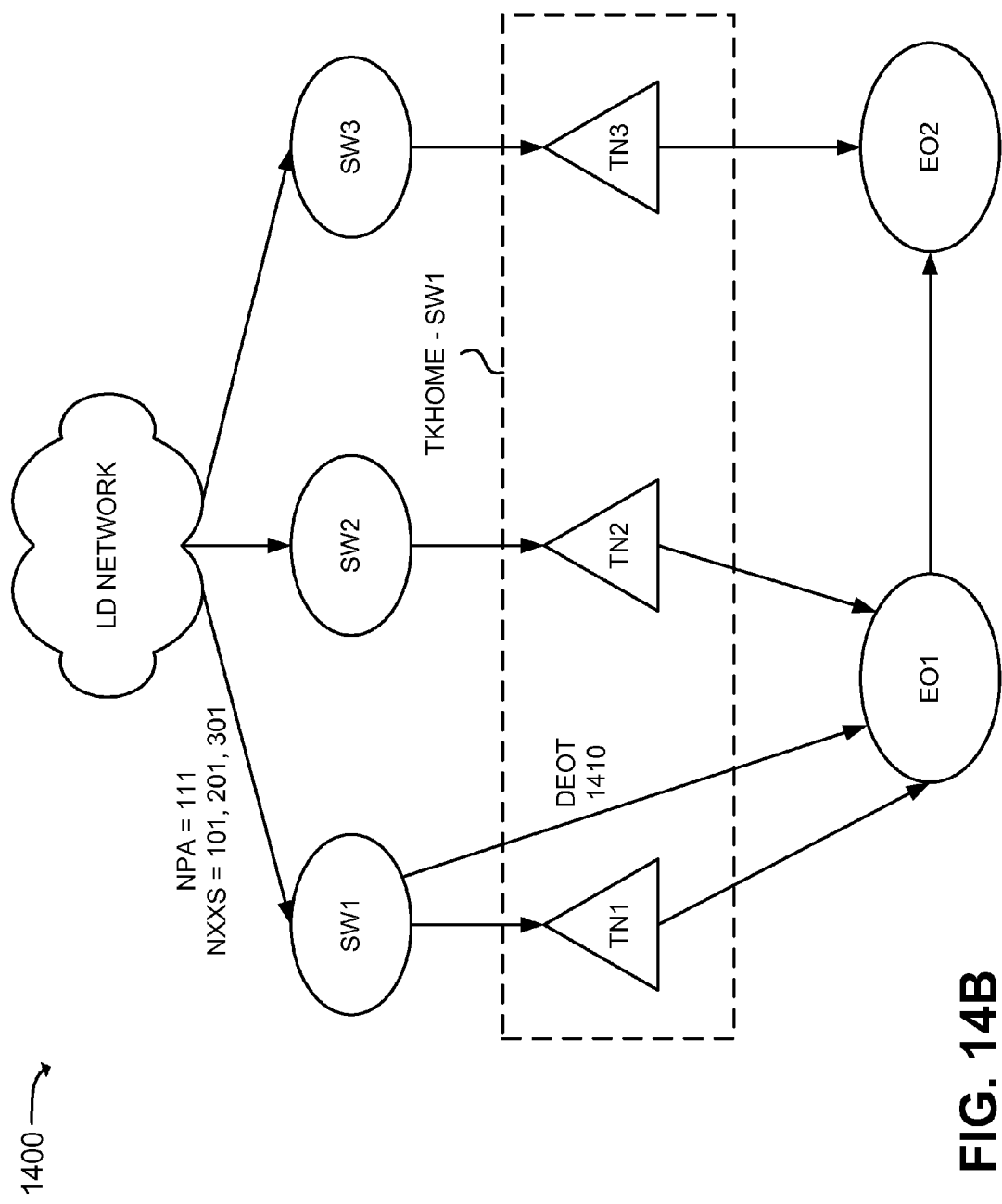

The techniques described above are not limited to routing traffic to a single end office. For example, FIGS. 14A-14B illustrate another example 1400 of the processing described above with respect to FIGS. 8 and 12, where a first end office EO1 homes to a second end office EO2. In example 1400, assume that a portion of a network includes a long distance (LD) network, three class 3 switches SW1, SW2, and SW3, three tandem switches TN1, TN2, and TN3, and end offices EO1 and EO2. Assume further that telephone calls to NPA "111" and NXX "101" are routed from the long distance network to end office EO1 through switch SW1 and tandem switch TN1; telephone calls to NPA "111" and NXX "201" are routed from the long distance network to end office EO1 through switch SW2 and tandem switch TN2; and telephone calls to NPA "111" and NXX "301" are routed from the long distance network to end office EO2 through switch SW3 and tandem switch TN3. Assume further that a trunk exists between end office EO1 and end office EO2, allowing traffic to be transmitted from end office EO1 to end office EO2.

Assume that a new DEOT trunk 1410 is installed between switch SW1 and end office EO1, as indicated by the dotted line in FIG. 14A. To take advantage of the presence of DEOT 1410 in the network, a user may desire to change the routing of the network. To do so, the user, using a user device, may interact with a network management device in the manner described above to change the network routing of the switches in the long distance network and the switch SW1. In this situation, however, the network management device may identify all of the NXXs that home to end office EO1 and end office EO2. In this example, the NXXs would include "101," "201," and "301" for NPA "111." The network management device may automatically create a virtual destination for these NXXs. In this example, the virtual destination would be TKHOME-SW1, indicating that switch SW1 is the trunk home for end offices EO1 and EO2, as illustrated in FIG. 14B.

A user may change the routing in the network to reflect that switch SW1 is the trunk home for traffic going to end office EO1 or end office EO2, in a manner similar to that described above with respect to FIG. 8 and the example of FIGS. 13A-13H. Thereafter, when a long distance switch receives a telephone call for NPA "111" and NXX "101," "201," or "301," the long distance switch may route the telephone call to switch SW1, as indicated in FIG. 14B. Upon receipt of the telephone call, switch SW1 may route the telephone call to end office EO1 over DEOT 1410. If the telephone call is for NPA "111" and NXX "301," end office EO1 may forward the call to end office EO2. By using DEOT 1410, traffic may be transmitted to end office EO1 and end office EO2 more cheaply than prior techniques.

Embodiments described herein may allow users to create virtual destinations for routing traffic in a network. The virtual destinations may be associated with names that allow the users to readily identify the actual network device to which traffic is routed, aiding in network configuration and troubleshooting.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while a series of acts has been described with respect to FIGS. 8 and 12, the order of the acts may be varied in other embodiments. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a network management device, first information relating to a trunk to be added between a switch and an end office,
the network management device being remote from the switch;
receiving, by the network management device, second information indicating that the trunk is a trunk home for the end office;
creating, by the network management device, a virtual destination for the end office based on the first information and the second information,
the virtual destination representing a group of network devices associated with the end office and the switch;
identifying, by the network management device, routing changes to be made, associated with the switch and a group of switches, based on adding the trunk; and
updating, by the network management device and based on the routing changes, a data structure that contains routing information associated with the switch and the end office.

2. The method of claim 1, where the group of network devices includes a group of tandem switches.

3. The method of claim 1, where creating the virtual destination includes:
identifying Numeric Numbering eXchanges (NXXs) that home to the end office, and
identifying tandem switches that route traffic to the end office for the identified NXXs to form the virtual destination,
the group of network devices including the tandem switches.

4. The method of claim 1, further comprising:
providing a report that identifies the routing changes to be made based on adding the trunk,
the routing changes being to cause the group of switches to route traffic, for the end office, to the switch.

5. The method of claim 4, where the report identifies network routing prior to the trunk being added and network routing after the trunk is added.

6. The method of claim 4, where the report indicates that the switch is to route the traffic to the end office over the trunk prior to routing the traffic to other network devices.

7. The method of claim 1, further comprising:
performing an audit of the routing changes; and
providing results of the audit for display.

8. The method of claim 1, further comprising:
receiving, after identifying the routing changes, an indication to implement the routing changes, and
causing, after receiving the indication, the routing changes to be made to the group of switches and to the switch.

9. The method of claim 1, where updating the data structure includes:
receiving a notification that the routing changes have been successfully implemented,
updating, based on the notification, the data structure to indicate the routing changes to the group of switches and the switch.

10. A system comprising:
a network management device comprising one or more processors to:
receive first information relating to a trunk to be added between a switch and an end office,
the network management device being remote from the switch, and
the first information including information identifying the switch and the end office,
receive second information indicating that the trunk is a trunk home for the end office,
create a virtual destination for the end office based on the first information and the second information, the virtual destination representing tandem switches associated with the end office and the switch, identify network routing changes to long distance switches and the switch based on adding the trunk, and update, based on the network routing changes, one or more data structures that store routing information associated with the switch and the end office.

11. The system of claim 10, where the one or more processors are further to:

provide, for display, information identifying the network routing changes.

12. The system of claim 10, where, when creating the virtual destination, the one or more processors are to:

identify Numeric Numbering eXchanges (NXXs) that home to the end office, group the tandem switches that route traffic for the NXXs to the end office, and create the virtual destination for the end office based on the tandem switches.

13. The system of claim 10, where the virtual destination is associated with a name that identifies the switch.

14. The system of claim 10, where the one or more processors are further to:

perform an audit of the network routing changes to identify issues that would occur if the network routing changes were implemented, and provide results of the audit for display.

15. The system of claim 10, where the one or more processors are further to:

receive an indication to implement the network routing changes, and cause, after receiving the indication, the network routing changes to be made to the long distance switches and the switch.

16. The system of claim 10, where, when updating the one or more data structures, the one or more processors are to:

determine that the routing changes are made to the long distance switch and the switch, and update the one or more data structures, based on the network routing changes, after determining that the network routing changes are made to the long distance switches and the switch.

17. The system of claim 11, where the network routing changes include a change to the switch that causes the switch to route traffic to the end office, over the added trunk, prior to routing traffic to other network devices.

18. A method comprising:

receiving, by a network management device, information for installing a trunk between a first switch and an end office, the network management device being remote from the first switch, and the trunk being a trunk home for the end office;

identifying, by the network management device, Numeric Numbering eXchanges (NXXs) that home to the end office;

creating, by the network management device, a virtual destination for the end office based on the information for installing the trunk and the NXXs; and causing, by the network management device and by using the virtual destination, traffic for at least one of the NXXs to be routed to the end office through a second switch that is different from the first switch.

19. The method of claim 18, where the first switch and the second switch include class 3 switches.

20. The method of claim 18, where creating the virtual destination includes:

identifying tandem switches that are associated with the NXXs; and grouping the tandem switches to form the virtual destination for the end office.

21. The method of claim 20, where the virtual destination is associated with a name that identifies the first switch.

22. The method of claim 18, further comprising:

receiving a command to route the traffic to the first switch; and causing the traffic to be routed to the first switch based on the command.

23. The method of claim 22, further comprising:

routing the traffic from the first switch directly to the end office over the installed trunk.

24. The method of claim 1, further comprising:

creating an identifier for the virtual destination based on an identifier of the switch, and providing information regarding the virtual destination based on the identifier created for the virtual destination.

* * * * *